Inventors
Raymond E. Crotty
Clinton G. Goss
BY
Mueller and Aichele
Attys.

Nov. 19, 1968  R. E. CROTTY ET AL  3,412,405
SIDE LOBE RESPONSE REDUCING SYSTEM
Filed Sept. 14, 1964
2 Sheets-Sheet 2
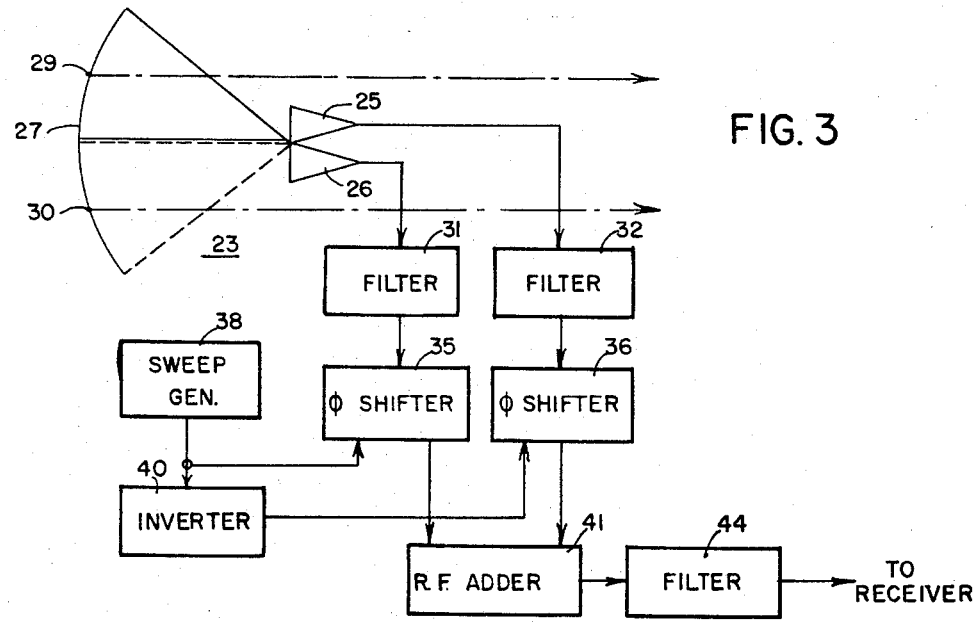
FIG. 3
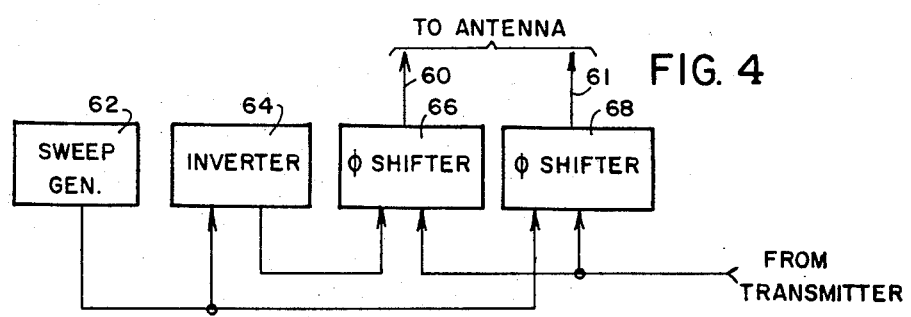
FIG. 4
FIG. 5
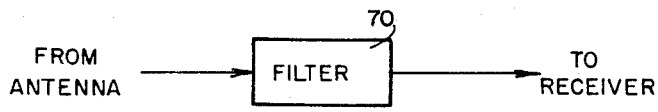
Inventors
Raymond E. Crotty
Clinton G. Goss.
BY
Mueller and Aichele
Attys.

United States Patent Office 3,412,405
Patented Nov. 19, 1968

3,412,405
SIDE LOBE RESPONSE REDUCING SYSTEM
Raymond E. Crotty, Oak Park, and Clinton G. Goss, Glenview, Ill., assignors to Motorola, Inc., Chicago, Ill., a corporation of Illinois
Filed Sept. 14, 1964, Ser. No. 396,127
4 Claims. (Cl. 343—777)

ABSTRACT OF THE DISCLOSURE

Targets positioned on the main axis of a radar antenna are distinguished from targets off the main axis by continuously shifting the phase center of the antenna in a direction normal to the main axis of the antenna. By this means a Doppler shift is developed in signals propagated in directions other than along the main axis. By the use of filters the Doppler shifted frequencies are rejected so that signals propagated along the main axis are distinguished from signals propagated in other directions.

---

Figure 1:
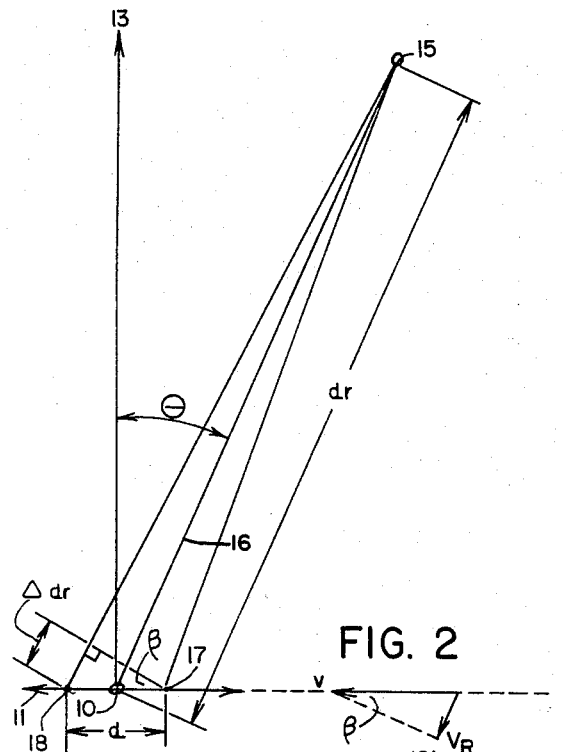

Directional antennas used for transmitting and receiving wave energy have antenna patterns which include side lobes. The sensitivity of the antenna to these side lobes can produce directional errors in target detection and energy may be transmitted in undesired directions resulting in interference to other receivers. It may also be desirable to be able to distinguish between a signal from a target located along the main axis of the antenna and off axis signals. Increasing the resolution of the antenna, by increasing the antenna aperture, reduces but does not eliminate the side lobes and does not provide a system for distinguishing between an off axis target and one on the main axis.

It is therefore an object of this invention to provide an improved directional wave energy radiation system.

Another object of this invention is to provide an antenna system which distinguishes between the main axis response and side lobe responses.

Another object of this invention is to provide a direction finding antenna system in which targets located on the main antenna axis are distinguished from off axis targets.

A feature of this invention is the provision of a directional antenna system in which the phase center of the antenna is continuously moved along a path normal to the main axis of the antenna.

In practicing this invention, an antenna system is provided wherein the phase center of the antenna is rapidly and continuously moved along a path normal to the main axis of the antenna. The main axis of the antenna is defined as the line through the antenna phase center in the direction of maximum radiation. Where there is more than one direction of maximum radiation the direction of the main axis can be selected along any one of the maximum radiation directions. The movement of the phase center can be accomplished by moving the antenna physically or electrically. A signal received from any direction other than along the main antenna axis will then be changed in frequency, with the amount of change being a function of the velocity of the phase center and the angle between the main antenna axis and the direction from which the signal is being received. Signals received along the main antenna axis, normal to the movement of the phase center of the antenna, will not be shifted in frequency. By using an appropriate filter, signals received along the main antenna axis can be separated from those received from other directions.

The antenna pattern of a transmitting antenna is also changed by the movement of its phase center along a path normal to the main axis. Also, when the phase center is moved the frequency of the signals transmitted along axes other than the main antenna axis will vary in frequency dependent upon the phase center velocity and the angle between the main antenna axis and the direction of propagation of the off axis signal. While the system has been described as moving the phase center normal to the main axis, the phase center can be moved normal to a particular direction, other than the main axis, to introduce a Doppler shift in signals radiated in directions other than the particular direction. The system is not limited to a radio antenna system and can be used with any wave energy receiving or transmitting system which couples energy between a circuit and an unguided propagation medium, as for example, radar or sonar receivers and transmitters.

Another feature of this invention is the provision of an antenna system including a reflector and a pair of feed horns positioned to illuminate the reflector, and wherein the phases of the signals received by the feed horns are varied to move the phase center of the antenna across the reflector in a direction normal to the main antenna axis.

Another feasure of this invention is the provision of an antenna system including a plurality of antenna elements forming a linear array with a portion of the elements of the array coupled to a transmission line by switches and wherein the elements of the array so coupled are changed to move the phase center across the array in a direction normal to the main antenna axis.

Another feature of this invention is the provision of an antenna system in which the frequency of off axis signals is shifted relative to the signal along the main axis by moving the phase center of the antenna normal to the main antenna axis. A filter is coupled to a receiving antenna to separate the main axis and off axis signals.

Figure 2:
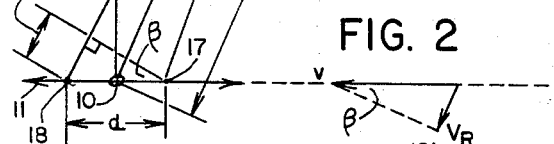
Figure 6:
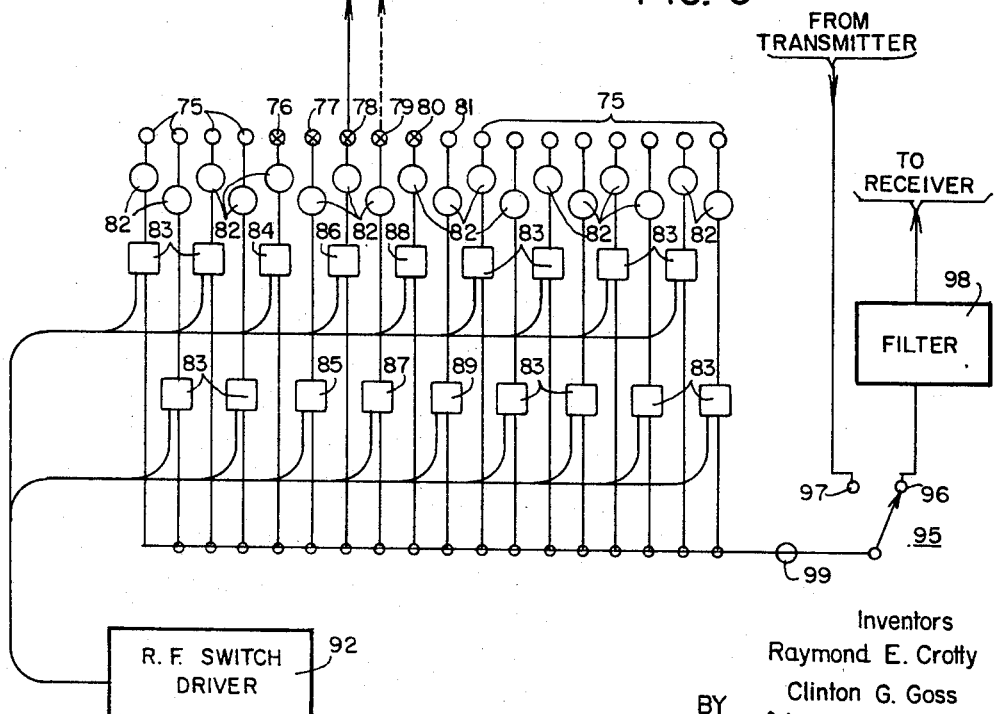

The invention is illustrated by the drawings wherein:
FIGS. 1 and 2 illustrate the operation of the system;
FIG. 3 and FIG. 4 are block diagrams of a system incorporating the features of the invention;
FIG. 5 is a receiver system for use with the transmitters of FIG. 4; and
FIG. 6 is a block diagram of another embodiment of a receiver and transmitter incorporating the features of the invention.

FIG. 1 illustrates a directional antenna 10, the main transmitting and receiving axis of which extends in the direction 13. The phase center of antenna 10 can be continuously moved back and forth along a path 11 normal to the main axis 13. Antenna 10 transmits or receives energy in directions other than along its main axis 13 and thus an off axis target 15, located at an angle $\theta$ from main axis 13, will be illuminated by the antenna.

If the phase center of antenna 10 is moved from position 17 to position 18 along the axis 11, through a distance $d$, the range $d_r$ to target 15 will change producing a Doppler shift in the frequency of signals radiated along axis 16. Thus, it can be seen that the frequency of radiation received from a target at an angle $\theta$ from the axis of antenna 10 differs from the transmitted frequency of the system by a frequency $\Delta f$ which is dependent upon the angle between the axis of the antenna and the off axis target and the velocity of movement of the phase center of the antenna along the axis 11. The radiation from the targets located on or near the main antenna axis 13 undergoes a negligible shift in frequency due to the movement of antenna 10 along path 11. By rapidly moving the antenna phase center along path 11 it is possible to distinguish between targets located on or near the main antenna axis and targets illuminated by the side lobes of the antenna.

The change in range from antenna 10 to target 15, $\Delta d_r$ has the relationship $$\Delta d_r = d \sin \beta \qquad (1)$$

where $\beta$ is the angle between the axis 11 and the normal to the line (18 to 15). The velocity, V, of movement of antenna 10 along path 11 is given by the equation $$V = d/\Delta t \qquad (2)$$

where $\Delta t$ is the time interval required for antenna 10 to proceed from point 17 to point 18. As shown in FIG. 2, $V_r$, the velocity of antenna 10 with respect to target 15 is given by the equation $$V_r = V \sin \beta \qquad (3)$$

When the range $d_r$ is very much greater than the distance, $d$, through which the phase center of antenna 10 is moved, angle $\beta$ is negligibly different from angle $\theta$ and thus Equation 3 becomes $$V_r = V \sin \theta \qquad (4)$$

thus, $$V_r = \frac{d \sin \theta}{\Delta t} = \frac{\Delta dr}{\Delta t} \qquad (5)$$

$\Delta \phi$, the phase shift, in radians, produced by moving the phase center of antenna 10 along path 11 has the relationship, $$\Delta \phi = 2\pi \Delta d_r / \lambda \qquad (6)$$

$$2\pi \Delta f = \Delta \omega = \Delta \phi / \Delta t = 2\pi \Delta d_r / \lambda \Delta t \qquad (7)$$

and $$\Delta f = \Delta d_r / \lambda \Delta t \qquad (8)$$

where $\Delta \omega$ is the change in angular frequency and $\Delta f$ is the Doppler frequency shift. Combining Equations 5 and 8

$$\Delta f = V_r / \lambda \qquad (9)$$

where $\lambda$ is the wavelength of the frequency transmitted or received by the antenna referring again to FIG. 1, V, the velocity of the phase center of antenna 10 moving along path 11, has the relationship, $$V = 2df_s \qquad (10)$$

where $f_s$ is the scanning frequency of the phase center of antenna 10 along axis 11. Combining Equations 4, 9 and 10, we arrive at the relationship, $$\Delta f = \frac{V \sin \theta}{\lambda} = \frac{2df_s}{\lambda} \sin \theta \qquad (11)$$

A system for carrying out this method of reducing side lobe response is shown in FIG. 3. Antenna feed horns 25 and 26 illuminate a parabolic reflector 27. Each feedhorn illuminates the entire reflector. The two feedhorns taken together provide a feed having twice the aperture dimension of a single feedhorn, hence, the beam width of the pattern of the feed consisting of two adjacent feedhorns is one-half of that of each feedhorn and, therefore, illuminates one-half of the reflector at any instant. By inserting varying phase shifts in the lines between feedhorns 25 and 26 and combining point 41 the pattern of the array of two feedhorns can be made to scan in angle thus illuminating different parts of the reflector at different times. Thus the phase center of antenna 23 can be moved from point 29 to point 30 through all points between, and the direction of movement of the phase center is normal to the main antenna axis. Due to the array factor associated with the location of the two feedhorns, only one-half of the reflector is illuminated at any instant. By varying the phases of the signals applied to each of the feedhorns, the portion of parabolic reflector illuminated by the seed horns is swept along parabolic reflector 27. Thus, the phase center of antenna 23 can be moved from point 29 to point 30, and the direction of movement is normal to the main antenna axis.

The output of feedhorns 25 and 26 are coupled to phase shifters 35 and 36, by filters 31 and 32, to produce the phase shift necessary to sweep the antenna phase center across antenna 23. Phase shifters 35 and 36 are controlled by a modulating signal from sweep generator 38. The modulating signal from sweep generator 38 is coupled directly to phase shifter 35 and to phase shifter 36 through inverter 40. The modulation signal from sweep generator 38 may be any shape depending upon the desired movement of the phase center of antenna 23. For example, sweep generator 38 may produce symmetrical or asymmetrical sawtooth modulating signals. The modulation signals may be linear or may be distorted to compensate for the nonlinearity of phase shift versus modulation, primary beam angle versus phase shift, and phase-center position versus primary beam angle functions.

The outputs from phase shifters 35 and 36 are combined in adder 41 and coupled to the receiver for further utilization through filter 44.

Filter 44 can be selected to reject off axis target signals or it can be designed to separate the off axis target signals from the main antenna axis signals. Filters 31 and 32 are bandpass filters which reject signals outside the band of frequencies of interest. This prevents such signals from being translated into the frequency band of interest by the Doppler shift added to the received signals. Such an undesired translation could occur, for example, when an undesired signal having a frequency such that it would be rejected by the normal filters (filters other than 31 and 32) in the system impinges on the antenna and has its frequency shifted by the phase within the passband of the normal filters. Filters 31 and center motion. The shifted frequency may then fall 32 prevent this by eliminating the undesired signal before its frequency is shifted.

A transmitting system for the antenna system shown in FIG. 3 is illustrated in FIG. 4. The signal to be transmitted is coupled to phase shifter 66 and 68 which shift the phase of the signals supplied thereto in response to signals from sweep generator 62 and inverter 64, as in the system shown in FIG. 3. Phase shifter 66 is coupled by transmission line 60 to feed horn 26, and phase shifter 68 is coupled by transmission line 61 to feed horn 25 of FIG. 3. Varying the phase of the signals will cause the phase center of antenna 23 to move between point 29 and point 30, normal to the main axis of propagation of antenna 23. Thus any energy radiated in directions other than along the main axis of antenna 23 will have its frequency changed by the Doppler shift produced by the movement of the phase center of antenna 23.

A receiver for the transmitting system of FIG. 4 is shown in FIG. 5. The received energy is coupled from the receiving antenna to filter 70, which is constructed to distinguish between energy transmitted in the direction of the main axis of antenna 23 of FIG. 3 and energy transmitted in directions other than along the main axis which is shifted in frequency. The filter is equivalent to the filter 44 of FIG. 3, and can be used with a single stationary antenna. The filtered energy is then coupled to a receiver for further utilization.

Another system for rapidly moving the phase center normal to the main axis of an antenna is shown in FIG. 6. A multi-element linear array consisting of elements 75 through 81 is positioned to propagate energy. The elements are connected to a receiver by means of filters 82 and radio frequency switches 83 through 89. The radio frequency switches are energized by RF switch driver 92 which may consist of known counter means and gate means for selectively energizing a portion of the radio frequency switches. Filters 82 are for the same purpose and act in the same manner as filters 31 and 32 of FIG. 3.

In the example shown in FIG. 6, radio frequency switches 84 through 88 are energized, coupling antenna elements 76 through 80 to RF line 99. With switch 95 connected to terminal 96 RF line 99 is coupled to filter 98 through RF switch 95. Filter 98 is designed to distinguish between signals of various frequencies received by the antenna and is similar to filter 44 of FIG. 3. With antenna elements 76 through 80 energized, the phase center of the antenna lies along the axis 100. To shift the phase center, radio frequency switch 89 is closed and radio frequency switch 84 is opened. This connects antenna elements 77 through 81 to RF line 99 moving the phase center of the antenna to axis 101. Thus, the phase center of the antenna is moved along a path normal to the main antenna axis by selectively energizing and de-energizing RF switches 83 through 89.

The antenna system shown in FIG. 6 can be used as a transmitting antenna by connecting switch 95 to terminal 97. This couples energy from a transmitter to RF line 99 and through the switches 84 through 88 to the elements 76 to 80. As described before the phase center of the given elements can be rapidly moved along the path normal to the main antenna axis, thereby producing a Doppler shift in frequencies radiated in directions other than along the main axis.

While the above examples have illustrated an antenna system for transmitting or receiving electro-magnetic radiations, the system described can also be used with a receiver or transmitter of other radiations which can be controlled in this manner, as for example, sound energy propagated in an unguided propagating medium such as water.

Thus, a simple system has been shown for distinguishing between the signals received, or propagated in the direction of the main axis of an antenna and those signals which are received, or propagated, in directions other than that of the main axis. By rapidly moving the phase center of the antenna normal to the main axis of the antenna, a Doppler phase shift is introduced into those signals received, or propagated, in directions other than that of the main axis. Appropriate filter means can then be used to distinguish between the main axis signals and those propagated in directions other than that of the main axis.

We claim:
1. A system for reducing the side lobe response of a signal transmitting antenna, including in combination, a transmitting antenna having a reflector to direct radiation signals of a predetermined frequency along a main axis and first and second feed horns, said first and second feed horns being positioned to direct radiation to a portion of said reflector, said portion having an antenna phase center, first phase shifting means coupled to said first feed horn and second phase shifting means coupled to said second feed horn, said phase shifting means being adapted to receive radio frequency signals and couple them to said feed horns, sweep generating means coupled to said first and second phase shifters for applying phase shifting signals thereto, said phase shifting signals acting to shift the phase of said radio frequency signals whereby said phase center is moved across said reflector in a direction normal to said main axis, said phase center movement producing a Doppler shift in the frequency of said signals transmitted in directions other than along said main antenna axis, whereby signals transmitted along said main axis have a frequency different from signals transmitted in said other directions.

2. A system for reducing the side lobe response of a signal receiving antenna, including in combination, a receiving antenna having a reflector to receive radiation signals of a predetermined frequency along a main axis and first and second feed horns, said first and second feed horns being positioned to receive radiation from a portion of said reflector, said portion having an antenna phase center, first phase shifting means coupled to said first feed horn and second phase shifting means coupled to said second feed horn, sweep generating means coupled to said first and second phase shifters for applying phase shifting signals thereto, said phase shifting signals acting to shift the phase of said radiation signals received by said feed horn whereby said phase center is moved across said reflector in a direction normal to said main axis, said phase center movement producing a Doppler shift in the frequency of said radiation signals received from directions other than along said main antenna axis, signal adding means coupled to said first and second phase shifting means for combining said first and second signals, filter means coupled to said signal adding means and responsive to said Doppler shift in frequency to reject only the transverse-motion Doppler shifted frequencies whereby signals received along said main axis can be distinguished from signals received from said other directions.

3. A system for reducing the side lobe response of a signal receiving antenna, including in combination, a receiving antenna having a reflector to receive radiation signals in a predetermined band of frequencies along a main axis and first and second feed horns, said first and second feed horns being positioned to receive radiation from a portion of said reflector, said portion having an antenna phase center, first phase shifting means and second phase shifting means, first filter means coupling said first feed horn to said first phase shifting means and second filter means coupling said second feed horn to said second phase shifting means, said first and second filter means being responsive to said signals in said predetermined band of frequencies to couple the same to said first and second phase shifting means and to reject signals outside of said band, sweep generating means coupled to said first and second phase shifters for applying phase shifting signals thereto, said phase shifting signals acting to shift the phase of said radiation signals received by said feed horns whereby said phase center is moved across said reflector in a direction normal to said main axis, said phase center movement producing a Doppler shift in the frequency of said radiation signals received from directions other than along said main antenna axis, signal adding means coupled to said first and second phase shifting means for combining said first and second signals, third filter means coupled to said signal adding means and responsive to said Doppler shift in frequency to reject only the transverse-motion Doppler shifted frequencies whereby signals received along said main axis can be distinguished from signals received from said other directions.

4. A system for reducing the side lobe response of a signal receiving antenna, including in combination, receiving antenna means having a plurality of antenna elements arranged to form a linear array to receive radiation signals in a predetermined band of frequencies along a main axis, said linear array having a phase center, a radio frequency feed line, a plurality of switches each coupled to said radio frequency feed line, a plurality of first filter means each coupling one of said plurality of switches to a separate one of said plurality of antenna elements, said first filter means being responsive to said signals in said predetermined band of frequencies to couple the same to said plurality of switches and to reject signals outside of said band, switch driving means coupled to each of said plurality of switches for selectively energizing a portion thereof, each of said energized switches acting to couple energy received by said antenna element coupled thereto to said feed line, said switch driving means acting to selectively energize and de-energize said switches whereby said phase center is moved along said linear array in a direction normal to said antenna main axis, said movement producing a Doppler shift in the frequency of signals received from directions other than along said main antenna axis, second filter means coupled to said feed line, said second filter means being responsive to said Doppler frequency shift to reject only the transverse-motion Doppler shifted frequencies whereby signals received along said main axis can be distinguished from signals received from said other directions.

References Cited

UNITED STATES PATENTS

| | | | |
|---|---|---|---|
| 2,929,058 | 3/1960 | Blasberg et al. | 343—777 X |
| 3,115,633 | 12/1963 | Kramar et al. | 343—101 X |
| 3,234,554 | 2/1966 | Earp et al. | 343—876 X |
| 2,411,518 | 11/1946 | Busignies. | |
| 3,082,417 | 3/1963 | Meyer | 331—179 X |

HERMAN KARL SAALBACH, *Primary Examiner.*

W. H. PUNTER, *Assistant Examiner.*